(12) United States Patent
Chuang

(10) Patent No.: US 8,938,235 B2
(45) Date of Patent: Jan. 20, 2015

(54) METHOD OF HANDLING CELL SELECTION AND RELATED COMMUNICATION DEVICE

(75) Inventor: Ming-Dao Chuang, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 0 days.

(21) Appl. No.: 13/415,783

(22) Filed: Mar. 8, 2012

(65) Prior Publication Data

US 2013/0053045 A1 Feb. 28, 2013

(30) Foreign Application Priority Data

Aug. 24, 2011 (TW) .............................. 100130339 A

(51) Int. Cl.
*H04W 4/00* (2009.01)
*H04W 48/20* (2009.01)
*H04W 76/04* (2009.01)

(52) U.S. Cl.
CPC ............ *H04W 48/20* (2013.01); *H04W 76/046* (2013.01)
USPC ......... 455/435.2; 455/434; 455/436; 455/440

(58) Field of Classification Search
CPC ... H04W 36/14; H04W 4/02; H04W 36/0061; H04W 36/0083; H04W 36/04; H04W 36/00; H04W 76/028; H04W 48/18; H04W 48/16; H04W 88/06
USPC ......... 455/411, 434–437, 440, 445, 446, 458; 370/332
See application file for complete search history.

(56) References Cited

U.S. PATENT DOCUMENTS

| | | | |
|---|---|---|---|
| 6,334,052 B1 * | 12/2001 | Nordstrand | 455/411 |
| 6,510,146 B1 * | 1/2003 | Korpela et al. | 370/332 |
| 2002/0032032 A1 * | 3/2002 | Haumont et al. | 455/436 |
| 2002/0197992 A1 * | 12/2002 | Nizri et al. | 455/435 |
| 2003/0153317 A1 * | 8/2003 | Friman et al. | 455/446 |
| 2005/0148349 A1 * | 7/2005 | Putcha et al. | 455/458 |
| 2005/0250529 A1 * | 11/2005 | Funnell et al. | 455/525 |
| 2006/0128392 A1 * | 6/2006 | Turina et al. | 455/452.1 |
| 2010/0216464 A1 * | 8/2010 | Funnell et al. | 455/434 |
| 2012/0276945 A1 * | 11/2012 | Chindapol et al. | 455/525 |

FOREIGN PATENT DOCUMENTS

| | | |
|---|---|---|
| EP | 1 631 108 A1 | 3/2006 |
| EP | 2 343 915 A1 | 7/2011 |

* cited by examiner

*Primary Examiner* — Nathan Taylor
(74) *Attorney, Agent, or Firm* — Winston Hsu; Scott Margo

(57) ABSTRACT

A method of handling cell selection for a mobile device in a wireless communication system is disclosed. The mobile device is transferring from a first mode to a second mode. The method comprises determining whether a plurality of active sets of the mobile device comprises at least one first cell of a location area of the wireless communication system, for producing a result, and the location area comprising a first cell serving the mobile device when the mobile device transfers from the second mode to the first mode; and selecting a second cell from the at least one first cell for camping in the second mode, when the result indicates that the plurality of active sets comprise the at least one first cell.

15 Claims, 10 Drawing Sheets

METHOD OF HANDLING CELL SELECTION AND RELATED COMMUNICATION DEVICE

BACKGROUND OF THE INVENTION

1. Field of the Invention

The present invention relates to a method used in a wireless communication system and related communication device, and more particularly, to a method of handling cell selection and related communication device.

2. Description of the Prior Art

Wideband Code Division Multiple Access (WCDMA) is adopted in third generation (3G) mobile communication systems as a wireless access technology, for providing high spectrum efficiency, universal coverage, and multimedia transmission with high quality and high data rate. Besides, various quality of service (QoS) requirements can be met at the same time, two-way transmissions with flexibility and diversity are provided, signal quality is improved, and a probability that communication is interrupted is reduced. Furthermore, a universal mobile telecommunications system (UMTS), one of the 3G mobile communication systems, provides a dual/multi mode function with which a user equipment (UE) can perform an inter-system handover, such as a handover between 2G and the 3G mobile communication systems, to enhance transparency between different mobile communication systems for the UE.

A large geographic area is divided into a large number of cells in a wireless communication system, such as the 3G mobile communication system, for reusing wireless resources (e.g. times, frequencies and/or codes) in different cells, to utilize the wireless resources efficiently. Further, neighboring cells are usually grouped into a location area, to reduce an amount of location update procedures performed by the UE. Thus, an amount of control information transmitted/received by the UE can be reduced, and a probability that a mobile terminated (MT) call for the UE is missed can also be reduced.

For example, please refer to FIG. 1, which is schematic diagram of a wireless communication system 10 according to the prior art. The wireless communication system 10 includes location areas LA1, LA2 and LA3. Further, the location area LA1 includes cells CL_1, CL_2 and CL_3, the location area LA2 includes cells CL_4 and CL_5, and the location area LA3 includes a cell CL_6. When a UE UE_P is in a coverage of the cell CL_1, a network of the wireless communication system 10 not only transmits information of the UE UE_P to the cell CL_1, but also transmits the information of the UE UE_P to other cells of the location area LA1, e.g., the cells CL_2 and CL_3. Thus, when the UE UE_P moves from the coverage of the cell CL_1 to a coverage of the cell CL_2, the cell CL_2 can identify the UE UE_P, and the UE UE_P does not need to perform a location update procedure. Thus, an amount of control information transmitted/received by the UE UE_P can be reduced, and a probability that a MT call for the UE UE_P is missed can also be reduced. Oppositely, when the UE UE_P moves from the coverage of the cell CL_1 to a coverage of the cell CL_4, the cell CL_4 does not have the information of the UE UE_P, and can not identify the UE UE_P. Thus, the UE UE_P needs to perform the location update procedure, for providing the information of the UE UE_P to the cell CL_4. In this situation, the UE UE_P can not perform a data transmission or a voice call during the location update procedure (e.g., several seconds). Further, the UE UE_P may move across multiple location areas. For example, the UE UE_P first moves from the cell CL_1 to the cell CL_5, and then moves from the cell CL_5 to the cell CL_6. In this situation, the UE UE_P may not perform the data transmission or the voice call over 10 seconds, and inconvenience is caused to the UE UE_P.

On the other hand, a UE receives signals transmitted by neighboring cells and signals transmitted by a cell with which the UE currently communicates. Then, the UE measures qualities of the signals received, and feeds back the signal qualities to a network. According to the signal qualities fed back by the UE, the network indicates to the UE which cells should be added in active sets of the UE, and which cells should be removed from the active sets. In other words, the UE maintain the active sets according to the signal qualities of the cells, wherein signal qualities of cells in the active sets are better than signal qualities of other cells. The UE can access a service via the cells in the active sets, and can perform a handover with some or all of the cells in the active sets when moving. Further, the UE can select a cell from the cells in the active sets for camping on the cell, when the UE transfers to an idle mode.

In general, after the UE finishes a data transmission or a voice call, the UE transfers from a connected mode to the idle mode. The UE should determine a cell for camping in the idle mode, and the UE determines a cell with a best signal quality for camping according to the prior art. However, the cell with the best signal quality and a cell with which the UE finishes the data transmission or the voice call are not necessarily in a same location area. If the cell with the best signal quality and the cell with which the UE finishes the data transmission or the voice call are not in the same location area, the UE needs to perform the location update procedure before transferring to the idle mode. Thus, the UE can not perform the data transmission or the voice call again for seconds.

For example, please refer to FIG. 2, which is schematic diagram of signal qualities of cells in active sets of the UE UE_P in FIG. 1 according to the prior art. In FIG. 2, the active sets of the UE UE_P include the cells CL_1 and the CL_4 which are in the location areas LA_1 and LA_2, respectively. At the beginning, the UE UE_P camps in the idle mode, and camps on the cell CL_1. After the UE UE_P is triggered by a data transmission or a voice call and transfers from the idle mode to the connected mode, the cell CL_4 starts to serve the UE UE_P. The UE UE_P can perform the data transmission or the voice call via the cells CL_1 and CL_4 simultaneously, and quality of the data transmission or the voice call can be improved. After the data transmission or the voice call is finished, the UE UE_P transfers back to the idle mode again. Since signal quality of the cell CL_4 becomes better than signal quality of the cell CL_1 due to movement of the UE UE_P or variation of environment, the UE UE_P selects the cell CL_4 for camping on the cell CL_4 in the idle mode. However, the cells CL_1 and CL_4 are not in the same location area, and the UE needs to perform the location update procedure before transferring to the idle mode. Thus, the UE can not perform the data transmission or the voice call again for seconds. Therefore, how to determine a suitable cell for camping in the idle mode is an important topic to be discussed and addressed.

SUMMARY OF THE INVENTION

The present invention therefore provides a method and related communication device for handling cell selection to solve the abovementioned problems.

A method of handling cell selection for a mobile device in a wireless communication system is disclosed. The mobile device is transferring from a first mode to a second mode. The method comprises determining whether a plurality of active sets of the mobile device comprises at least one first cell of a location area of the wireless communication system, for producing a result, and the location area comprising a first cell serving the mobile device when the mobile device transfers from the second mode to the first mode; and selecting a second cell from the at least one first cell for camping in the second mode, when the result indicates that the plurality of active sets comprise the at least one first cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
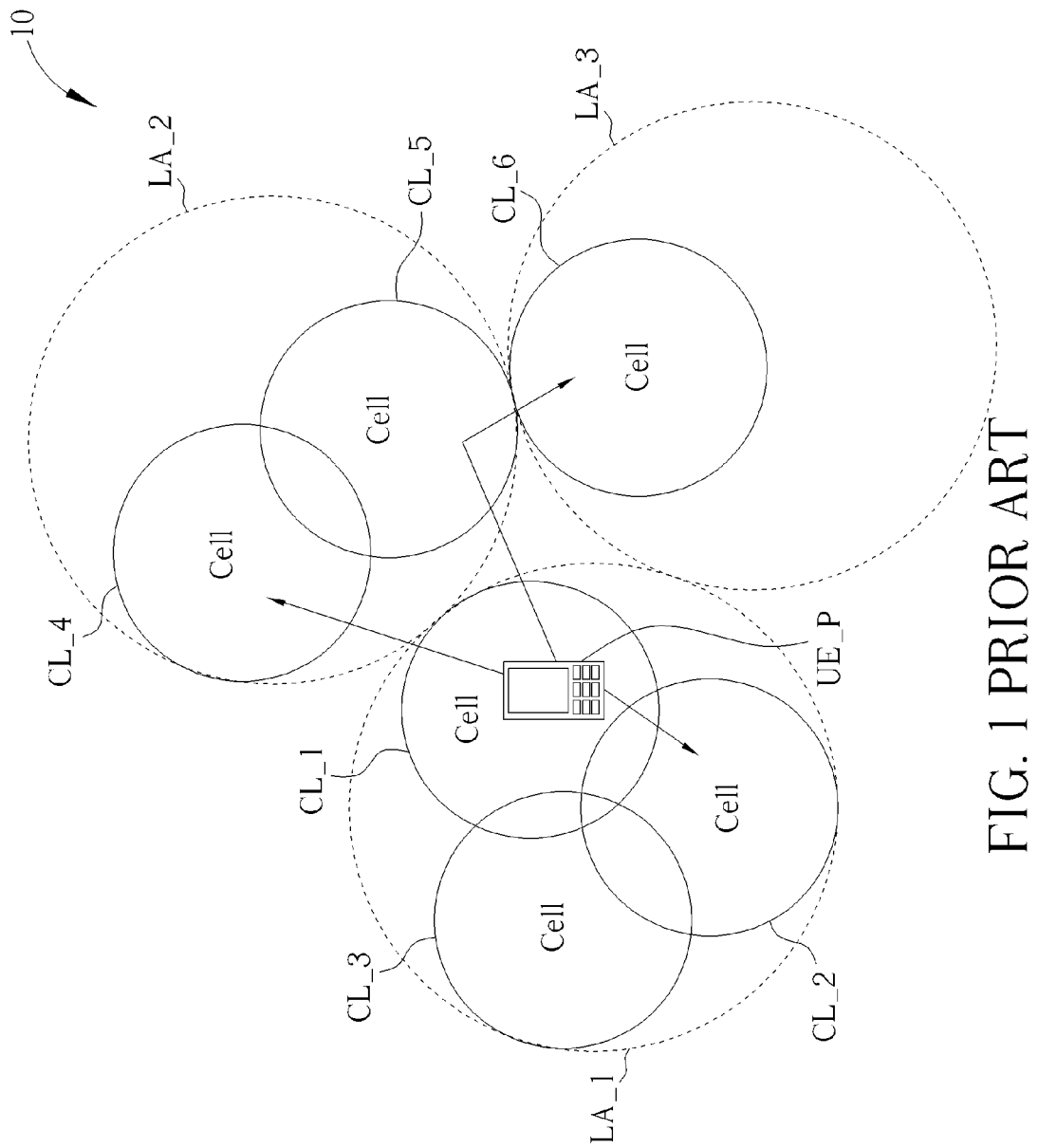
FIG. 1 is a schematic diagram of a wireless communication system according to the prior art.
Figure 2:
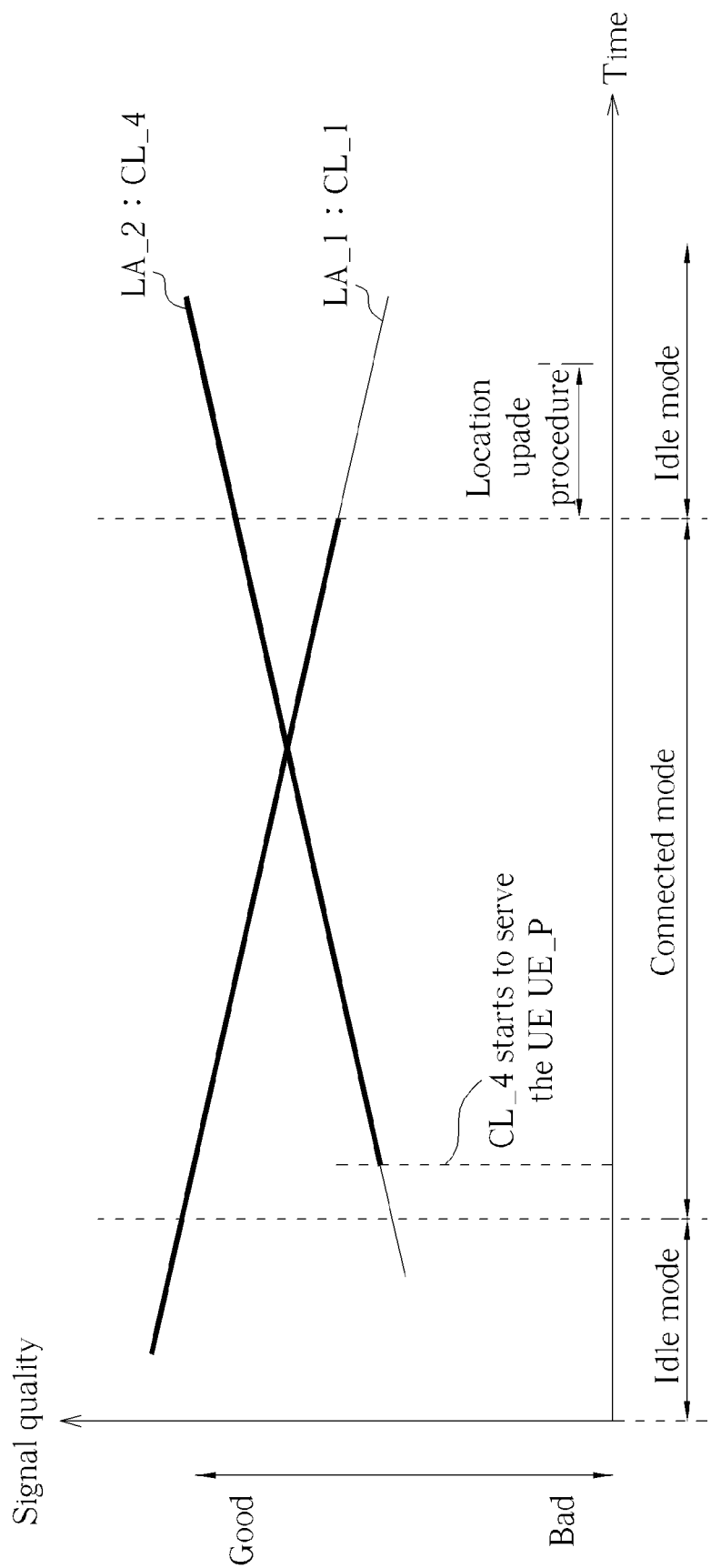
FIG. 2 is schematic diagram of signal qualities of cells in active sets of the UE UE_P in FIG. 1 according to the prior art.
Figure 3:
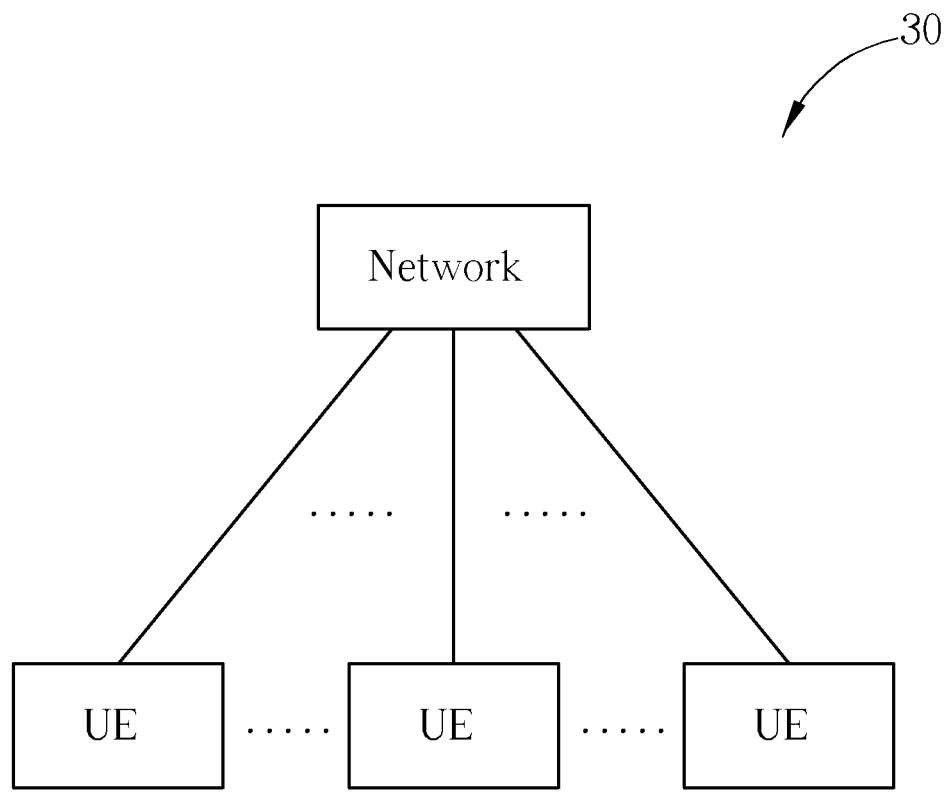
FIG. 3 is a schematic diagram of a wireless communication system according to an example of the present invention.

Please refer to FIG. 3, which is a schematic diagram of a wireless communication system 30 according to an example of the present invention. Preferably, the wireless communication system 30 is a third generation (3G) mobile communication system, and is briefly composed of a network and a plurality of user equipments (UEs). In FIG. 3, the network and the UEs are simply utilized for illustrating the structure of the wireless communication system 30. Practically, the network can be a universal terrestrial radio access network (UTRAN) comprising a plurality of Node-Bs (NBs) in a universal mobile telecommunications system (UMTS). The UEs can be mobile devices such as mobile phones, laptops, tablet computers, electronic books, and portable computer systems. Besides, the network and a UE can be seen as a transmitter or a receiver according to transmission direction, e.g., for an uplink (UL), the UE is the transmitter and the network is the receiver, and for a downlink (DL), the network is the transmitter and the UE is the receiver.

Figure 4:
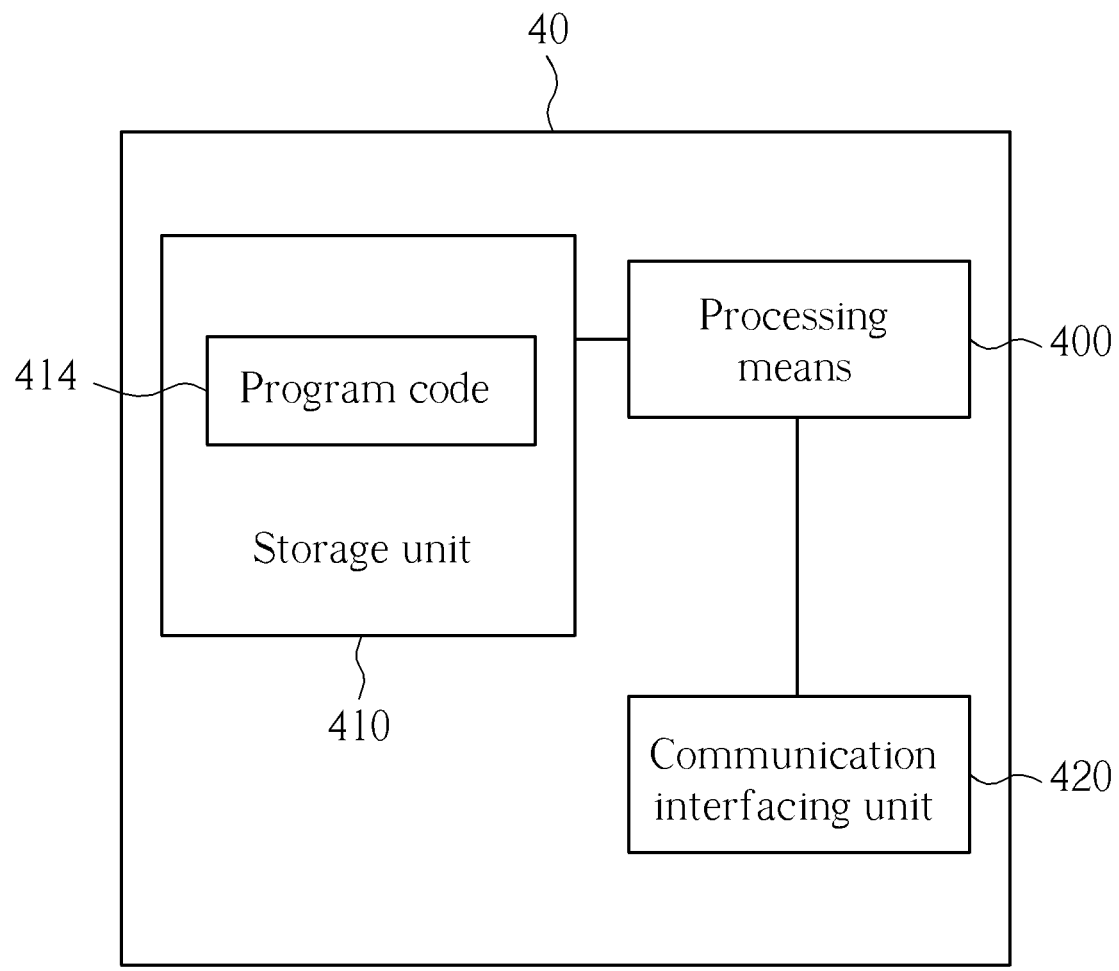
FIG. 4 is a schematic diagram of a communication device according to an example of the present invention.

Please refer to FIG. 4, which is a schematic diagram of a communication device 40 according to an example of the present invention. The communication device 40 can be a UE or the network shown in FIG. 3, but is not limited herein. The communication device 40 may include a processor 400 such as a microprocessor or Application Specific Integrated Circuit (ASIC), a storage unit 410 and a communication interfacing unit 420. The storage unit 410 may be any data storage device that can store a program code 414, accessed and executed by the processor 400. Examples of the storage unit 410 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 420 is preferably a transceiver and is used to transmit and receive signals according to processing results of the processor 400.

Figure 5:
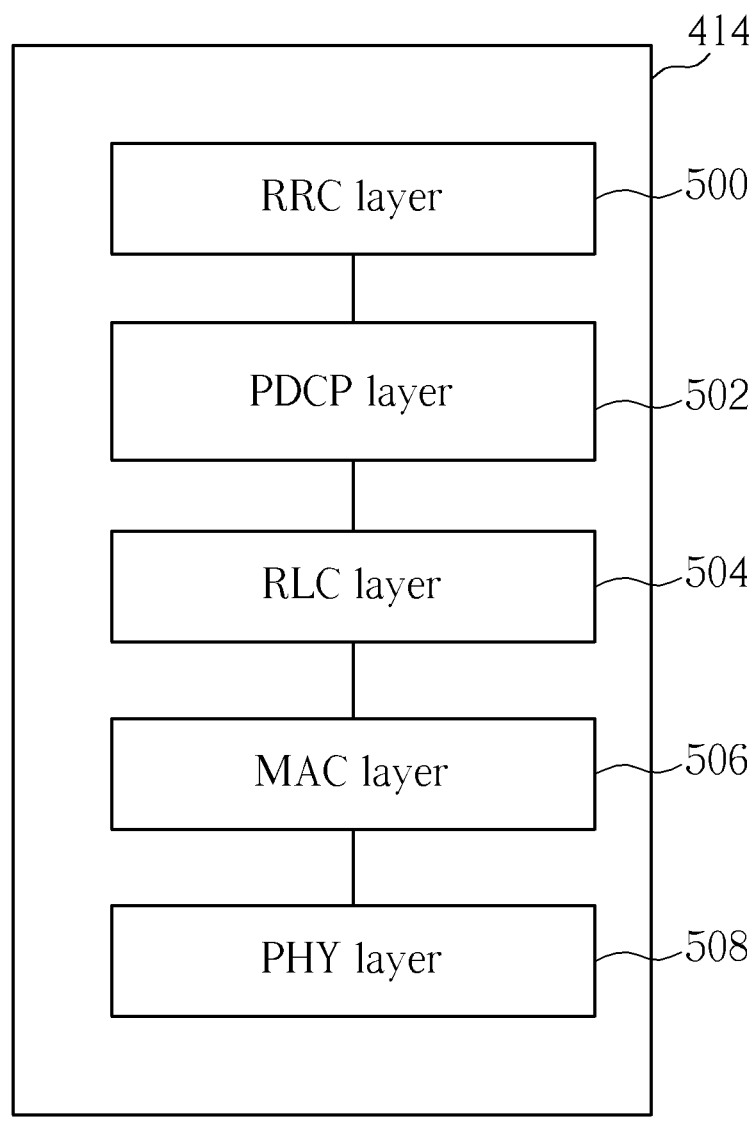
FIG. 5 is a schematic diagram of communication protocol layers for a wireless communication system according to an example of the present invention.

Please refer to FIG. 5, which illustrates a schematic diagram of communication protocol layers for the wireless communication system 30. The behaviors of some of the protocol layers may be defined in the program code 414 and executed by the processing means 500. The protocol layers from top to bottom are a radio resource control (RRC) layer 500, a packet data convergence protocol (PDCP) layer 502, a radio link control (RLC) layer 504, a medium access control (MAC) layer 506 and a physical (PHY) layer 508. The RRC layer 500 is used for performing broadcast, paging, RRC connection management, measurement reporting and control and radio bearer control responsible for generating or releasing radio bearers. The PDCP layer 502 is used for ciphering and integrity protection of transmissions, and maintaining delivery order during a handover. The RLC layer 504 is used for segmentation/concatenation of packets and maintaining delivery sequence when packet loses. The MAC layer 506 is responsible for a hybrid automatic repeat request (HARQ) process, multiplexing logical channels, a random access channel (RACH) procedure and maintaining a UL timing alignment. In each HARQ process, an acknowledgement (ACK) is reported to the network if the MAC data/control packet is received and decoded successfully. Otherwise, a negative acknowledgement (NACK) is reported to the network. The PHY layer 308 is used to provide physical channels, e.g., physical UL shared channel (PUSCH), physical DL shared channel (PDSCH), physical UL control channel (PUCCH) and physical DL control channel (PDCCH), etc., such that control information and data of different UEs can be transmitted and received with low and even no interference.

Figure 6:
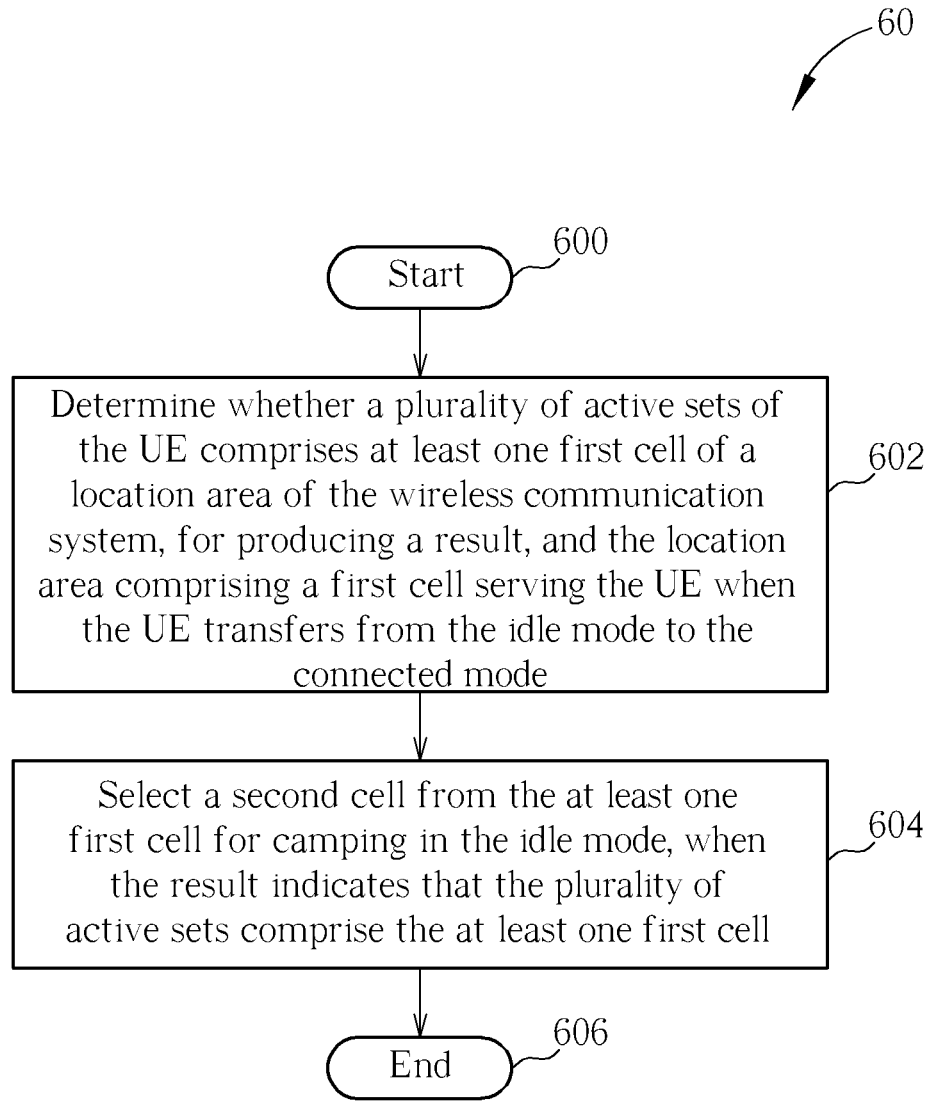
FIG. 6 is a flowchart of a process according to the present invention.

Please refer to FIG. 6, which is a flowchart of a process 60 according to an example of the present invention. The process 60 is utilized in a UE shown in FIG. 3, for handling cell selection. The UE is transferring (i.e., starts to transfer) from a connected mode to an idle mode. The process 60 may be compiled into the program code 414 and includes the following steps:

Step 600: Start.

Step 602: Determine whether a plurality of active sets of the UE comprises at least one first cell of a location area of the wireless communication system, for producing a result, and the location area comprising a first cell serving the UE when the UE transfers from the idle mode to the connected mode.

Step 604: Select a second cell from the at least one first cell for camping in the idle mode, when the result indicates that the plurality of active sets comprise the at least one first cell.

Step 606: End.

After the UE finishes a data transmission or a voice call, the UE transfers from the connected mode to the idle mode. According to the process 60, the UE first determines whether a plurality of active sets of the UE comprises at least one first cell of a location area of the wireless communication system, for producing a result, and the location area comprising a first cell serving the UE when the UE transfers from the idle mode to the connected mode. Then, the UE selects a second cell from the at least one first cell for camping in the idle mode, when the result indicates that the plurality of active sets comprise the at least one first cell. In other words, when the UE transfers from the connected mode to the idle mode, the UE selects the second cell from the plurality of active sets according to the location area, such that the second cell and the first cell are both in the same location area, wherein the first cell serves the UE when the UE transfers from the idle mode to the connected mode, i.e., when the UE is triggered by the data transmission or the voice call. Thus, the UE does not need to perform a location update procedure, when transferring from the connected mode to the idle mode. As a result, the UE can perform a data transmission or a voice call without being affected by the location update procedure, when transferring from the connected mode to the idle mode, i.e., starting to camp on the second cell.

Please note that, since the UE is served by a first cell of a location area when transferring from an idle mode to a connected mode, according to the process 60, the UE selects a second cell in the location area when the UE transfers from the connected mode to the idle mode, such that the second cell and the first cell are both in the same location area and a location update procedure is avoided. Realization of the process 60 is not limited. For example, when the UE is transferring (i.e., starts to transfer) from the connected mode to the idle mode, the UE can camp on the first cell directly if the first cell is included inactive sets of the UE. Thus, the UE does not need to perform the location update procedure. Further, the UE does not need to change the first cell serving the UE.

Figure 7:
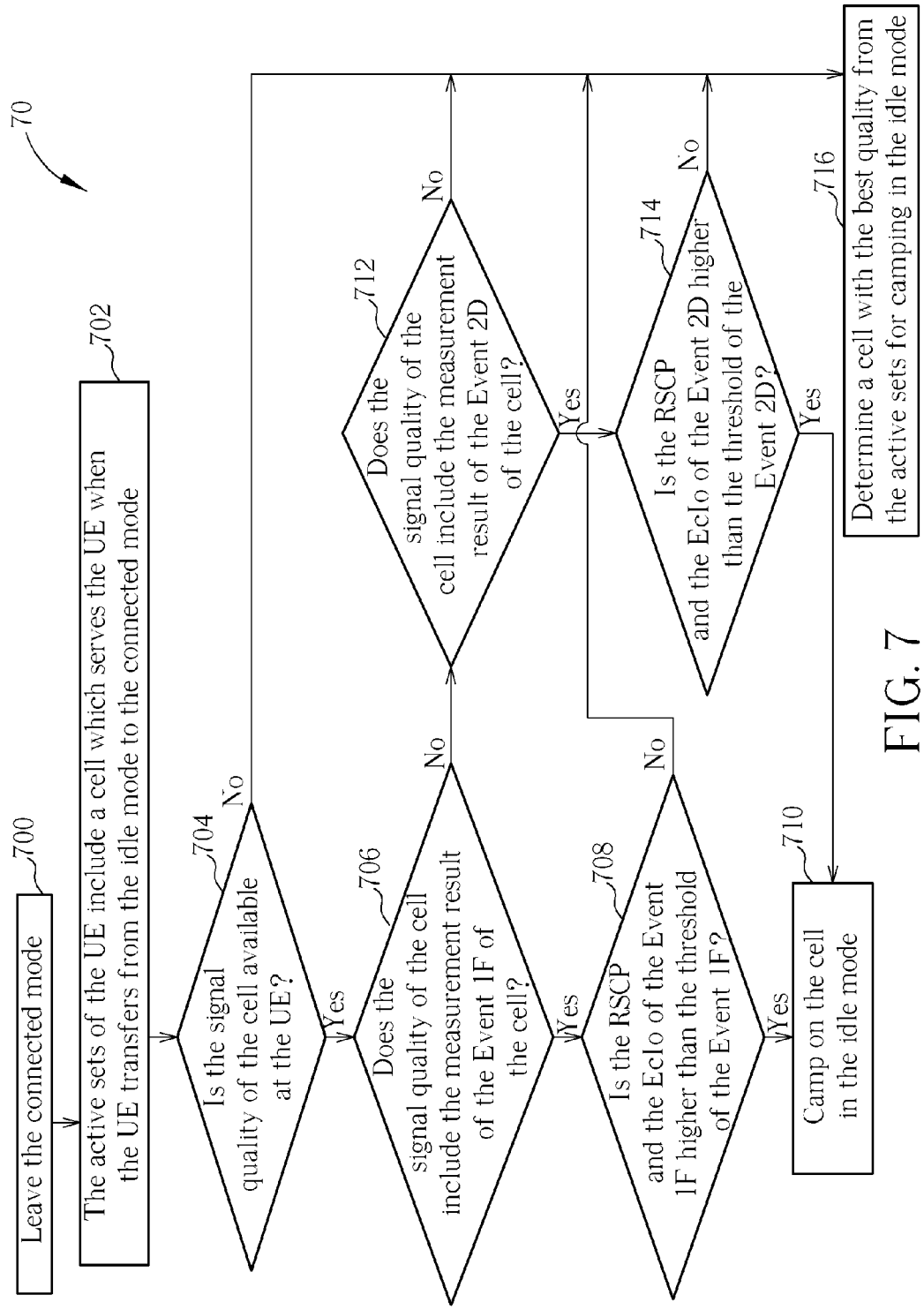
FIG. 7 is a flowchart of a process according to the present invention.

Please refer to FIG. 7, which is a flowchart of a process 70 according to an example of the present invention. The process 70 is utilized in a UE shown in FIG. 3, for handling cell selection. In detail, when the UE leaves a connected mode (i.e., the step 700), the UE determines that active sets of the UE include a cell which serves the UE when the UE transfers from an idle mode to the connected mode (i.e., the step 702). Then, the UE checks whether signal quality of the cell is available at the UE (i.e., the step 704), i.e., whether the UE has the signal quality of the cell. If the signal quality of the cell is available at the UE, the UE continues to check whether the signal quality of the cell includes a measurement result of Event 1F of the cell (i.e., the step 706), wherein the Event 1F is an event indicating that signal quality of a primary common pilot channel (P-CPICH) is lower than a threshold. The Event 1F is defined in 3rd Generation Partnership Project (3GPP) technical specification (TS) 25.331, for indicating the UE to measure and report the signal quality. If the signal quality of the cell includes the measurement result of the Event 1F, the UE compares received signal code power (RSCP) and ratio of received pilot energy to total received energy (EcIo) of the Event 1F with the threshold of the Event 1F (i.e., the step 708). If the RSCP and the EcIo of the Event 1F is higher than the threshold of the Event 1F, the UE determines the cell for camping in the idle mode (i.e., the step 710). Besides, if the signal quality of the cell does not include the measurement result of the Event 1F, the UE continues to check whether the signal quality of the cell includes a measurement result of Event 2D of the cell (i.e., the step 712), wherein the Event 2D is an event indicating that signal quality of a frequency band currently being used is lower than a threshold. The Event 2D is also defined in the 3GPP TS 25.331, for indicating the UE to measure and report the signal quality. Similarly, if the signal quality of the cell includes the measurement result of the Event 2D, the UE compares RSCP and EcIo of the Event 2D with the threshold of the Event 2D (i.e., the step 714). If the RSCP and the EcIo of the Event 2D is higher than the threshold of the Event 2D, the UE determines the cell for camping in the idle mode (i.e., the step 710). On the other hand, if the measurement results of the Event 1F and the Event 2D are not available at the UE or the measurement results (i.e., the RSCP and/or the EcIo) are lower than the thresholds, the UE determines a cell with a best quality from the active sets for camping in the idle mode (i.e., the step 716), and performs a location update procedure.

In other words, according to the process 70, before the UE determines the cell which serves the UE when the UE transfers from the idle mode to the connected mode, for camping in the idle mode, the UE checks the signal quality of the cell, to avoid that the UE is not able to camp on the cell in the idle mode, i.e., the signal quality is too bad such that the UE can not keep connection with the cell. When the signal quality is lower than the threshold, the UE determines the cell with the best quality from the active sets for camping in the idle mode, and performs the location update procedure.

Figure 8:
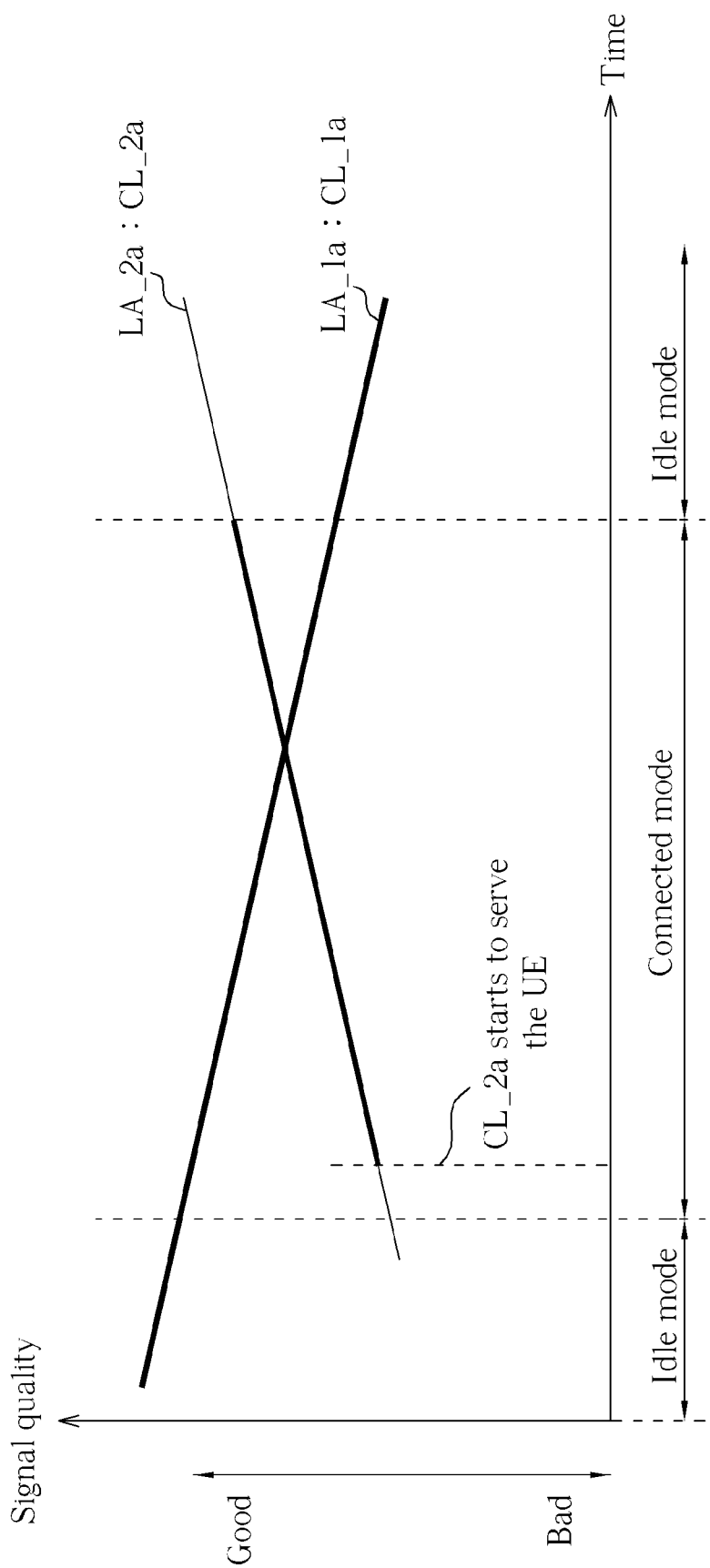
FIG. 8 is a schematic diagram of signal qualities of cells in active sets of a UE according to an example of the present invention.

Please refer to FIG. 8, which is a schematic diagram of signal qualities of cells in active sets of a UE according to an example of the present invention. FIG. 8 is used for illustrating the process 70. In FIG. 8, when the UE is in a connected mode, the active sets include cells CL_1a and CL_2a which are in location areas LA_1a and LA_2a, respectively. The signal qualities of the cells serving the UE are represented by bold lines. In detail, the UE camps in an idle mode on the cell CL_1a at first. After the UE is triggered by a data transmission or a voice call and transfers from the idle mode to the connected mode, the cell CL_2a starts to serve the UE. The UE can perform the data transmission or the voice call via the cells CL_1a and CL_2a simultaneously, and quality of the data transmission or the voice call can be improved. After the data transmission or the voice call is finished, the UE transfers back to the idle mode again. Even though signal quality of the cell CL_2a is better than signal quality of the cell CL_1a due to movement of the UE or variation of environment at this time, the UE selects the cell CL_1a for camping in on the cell CL_1a in the idle mode according to the process 70, as long as the signal quality of the cell CL_1a is higher than a threshold. Thus, a location update procedure can be avoided.

According to the prior art, location update procedures are performed, when the UE transfers between the connected mode and the idle mode. Accordingly, the UE cannot perform the data transmission or the voice call during the location update procedures. In contrast, according to the process 70, the cell serving the UE when the UE transfers from the idle mode to the connected mode is determined for camping in the idle mode, as long as the signal quality of the cell is higher than the threshold. Thus, the abovementioned problem is solved.

On the other hand, since a UE is served by a first cell in a location area when transferring from an idle mode to a connected mode, the UE can determines a second cell with a best signal quality of the location area for camping in the idle mode when the UE transfers back to the idle mode. Thus, the UE can camp on the second cell with the best signal quality, and a location update procedure is avoided since the second cell and the first cell are in the same location area.

Figure 9:
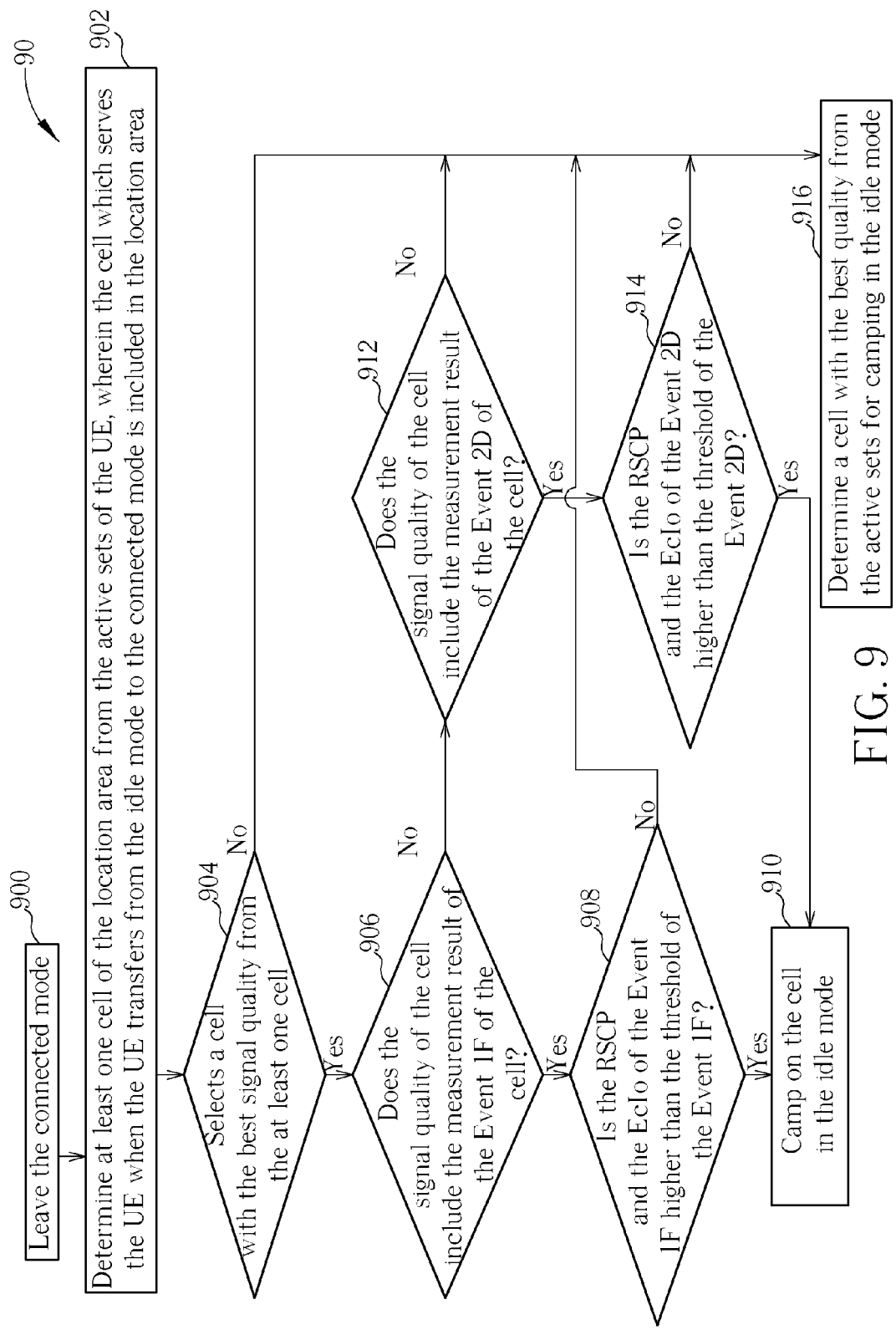
FIG. 9 is a flowchart of a process according to the present invention.

Please refer to FIG. 9, which is a flowchart of a process 90 according to an example of the present invention. The process 90 is utilized in a UE shown in FIG. 3, for handling cell selection. In detail, when the UE leaves a connected mode (i.e., the step 900), the UE first determines at least one cell of a location area from active sets of the UE, wherein a cell which serves the UE when the UE transfers from the idle mode to the connected mode is included in the location area (i.e., the step 902). Then, the UE selects a cell with a best signal quality from the at least one cell (i.e., the step 904). Steps 906, 908, 910, 912, 914 and 916 are the same as the steps 706, 708, 710, 712, 714 and 716, respectively, and are not narrated herein. In short, the UE checks signal quality of the cell, to avoid that the UE is not able to camp on the cell in the idle mode, i.e., the signal quality is too bad such that the UE can not keep connection with the cell. Besides, when the signal quality of the cell with the best signal quality is lower than a threshold (i.e., signal quality of each of the at least one cell is lower than the threshold), the UE does not have the signal quality of the each of the at least one cell or the active sets do not include the at least one cell (i.e., do not include any cell of the location area), the UE determines a cell with a best quality from the active sets for camping in the idle mode, and performs a location update procedure. In other words, when the UE can not determine a cell of the location area from the active sets or the signal quality of the cell of the location area determined from the active sets is lower than the threshold, the UE determines the cell with the best quality from the active sets for camping in the idle mode, and performs the location update procedure.

Comparing with the process 70, the process 90 further solves that the cell serving the UE when the UE transfers from the idle mode to the connected mode is removed from the active sets or the signal quality of the cell is lower than the threshold, such that the UE determines a cell with a different location area.

Figure 10:
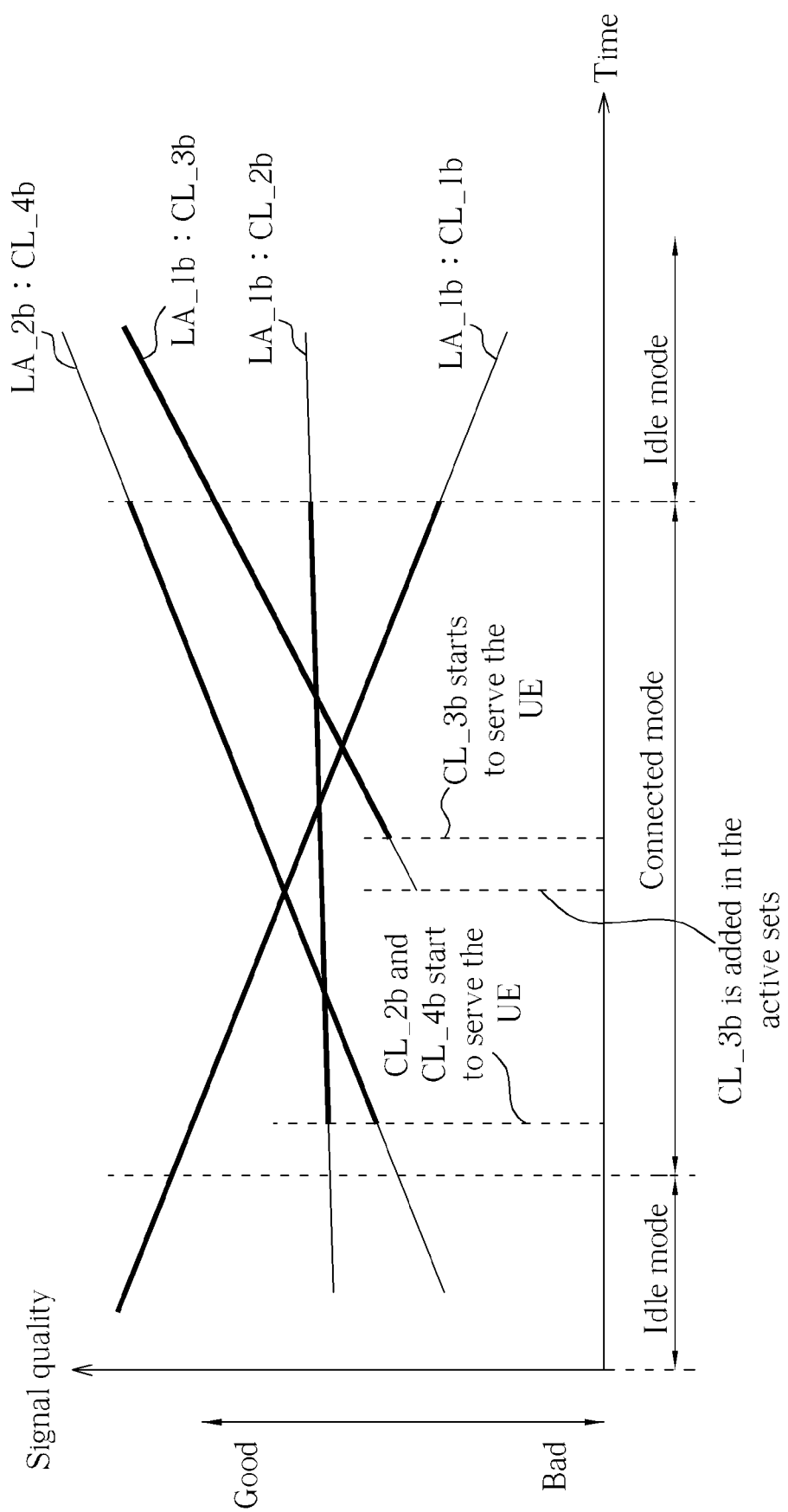
FIG. 10 is a schematic diagram of signal qualities of cells in active sets of a UE according to an example of the present invention.

Please refer to FIG. 10, which is a schematic diagram of signal qualities of cells in active sets of a UE according to an example of the present invention. FIG. 10 is used for illustrating the process 90. In FIG. 10, when the UE is in a connected mode, the active sets include cells of location areas LA_1b and LA_2b. Further, the location area LA_1b includes cells CL_1b, CL_2b and CL_3b, wherein the cell CL_3b is added in the active sets later, and the location area LA_2b includes a cell CL_4b. The signal qualities of the cells serving the UE are represented by bold lines. In detail, the UE camps in an idle mode on the cell CL_1b at first. After the UE is triggered by a data transmission or a voice call and transfers from the idle mode to the connected mode, the cell CL_2b, CL_4b and later CL_3b start to serve the UE. The UE can perform the data transmission or the voice call via the cells CL_2b, CL_3b and CL_4b simultaneously, and quality of the data transmission or the voice call can be improved. After the data transmission or the voice call is finished, the UE transfers back to the idle mode again. According to the process 90, the UE determines the cell CL_3b with a best signal quality from the location area LA_1b, and checks whether signal quality of the cell CL_3b is higher than a threshold. The UE camps on the cell CL_3b in the idle mode if the signal quality of the cell CL_3b is higher than the threshold. Thus, a location update procedure can be avoided.

As can be seen from the above, location update procedures are performed according to the prior art, when the UE transfers between the connected mode and the idle mode. Accordingly, the UE cannot perform the data transmission or the voice call during the location update procedures. In contrast, according to the process 90, the UE determines the second cell with the best signal quality of the location area from the actives sets of the UE, wherein the location area includes the first cell which serves the UE when the UE transfers from the idle mode to the connected mode. Thus, the above-mentioned problem is solved. Further, the UE camps on a cell with better signal quality.

Please note that, the UE can measure signal qualities and measurement results mentioned above according to a request transmitted by the network, and is not limited herein. Besides, measurement results used for determining whether the signal qualities is higher than corresponding thresholds are not limited to the measurement results of the Event 1F and the Event 2D, as long as the measurement results can be used for evaluating the signal qualities. On the other hand, two measurement results are used in the processes 70 and 90, and an amount of the measurement results can be increased or decreased according to capability of the UE, and is not limited herein.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 40.

To sum up, the present invention provides a method of handling cell selection for a UE in a wireless communication system. According to a location area of which a first cell serves the UE when the UE transfers from an idle mode to a connected mode, the UE selects a second cell from active sets of the UE for camping in the idle mode, such that the second cell and the first cell are in the same location area, and the UE does not need to perform a location update procedure. Thus, an amount of control information transmitted/received by the UE can be reduced, and a probability that a MT call for the UE is missed can also be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling cell selection for a mobile device in a wireless communication system wherein the system comprises multiple serving cells which belong to different location areas, the method comprising:
    transferring from an idle mode to a connected mode, when being served by a first cell in a location area of the wireless communication system in the idle mode;
    determining whether a plurality of active sets of the mobile device comprises at least one cell of the location area, when the mobile device starts to transfer from the connected mode back to the idle mode and
    selecting a second cell from the location area to camp on in the idle mode if the result of the determination indicates that the plurality of active sets comprise the least one cell, when the mobile device starts to transfer from the connected mode to the idle mode; wherein the first cell in the location area serves the mobile device since the mobile device transfers from the idle mode to the connected mode and the location area in which the first cell serves the mobile device since the mobile device transfers from the idle mode to the connected mode is selected by the mobile device.

2. The method of claim 1, wherein the mobile device selects the second cell by:
    selecting the first cell, when the plurality of active sets comprise the first cell.

3. The method of claim 2, wherein the mobile device selects the second cell by:
    determining whether signal quality of the first cell is available at the mobile device; and
    selecting the first cell, when the signal quality of the first cell is available at the mobile device and is higher than a threshold.

4. The method of claim 3, further comprising:
selecting a cell in the plurality of active sets with a best signal quality, when the signal quality of the first cell is not available at the mobile device.

5. The method of claim 3, further comprising:
selecting a cell in the plurality of active sets with a best signal quality, when the signal quality of the first cell is available at the mobile device and is lower than the threshold.

6. The method of claim 3, wherein the mobile device measures signal quality of a cell according to a request transmitted by a network of the wireless communication system.

7. The method of claim 3, wherein the signal quality comprises received signal code power (RSCP) and ratio of received pilot energy to total received energy (EcIo) of a first event or RSCP and EcIo of a second event, wherein the first event indicates that signal quality of a primary common pilot channel (P-CPICH) is lower than a first threshold, and the second event indicates that signal quality of a frequency band currently being used is lower than a second threshold.

8. The method of claim 7, wherein the threshold is the first threshold or the second threshold.

9. The method of claim 1, wherein the mobile device selects the second cell by:
selecting at least one second cell from the at least one first cell, wherein signal quality of each cell of the at least one second cell is available at the mobile device; and
selecting a cell with a best signal quality which is higher than a threshold from the at least one second cell according to the signal quality of the each cell of the at least one second cell.

10. The method of claim 9, further comprising:
selecting a cell in the plurality of active sets with a best signal quality, when the signal quality of the cell of the at least one second cell with the best signal quality is lower than the threshold.

11. The method of claim 9, wherein the mobile device measures signal quality of a cell according to a request transmitted by a network of the wireless communication system.

12. The method of claim 9, wherein the signal quality comprises RSCP and EcIo of a first event or RSCP and EcIo of a second event, wherein the first event indicates that signal quality of a primary common pilot channel (P-CPICH) is lower than a first threshold, and the second event indicates that signal quality of a frequency band currently being used is lower than a second threshold.

13. The method of claim 12, wherein the threshold is the first threshold or the second threshold.

14. The method of claim 1, further comprising:
selecting a cell in the plurality of active sets with a best signal quality, when the plurality of active sets do not comprise any cell of the location area.

15. The method of claim 1, further comprising:
selecting a cell in the plurality of active sets with a best signal quality, when signal quality of any cell of the at least one first cell is not available at the mobile device.

* * * * *